(12) United States Patent
Line et al.

(10) Patent No.: US 10,421,373 B2
(45) Date of Patent: Sep. 24, 2019

(54) ADJUSTABLE SEATING ASSEMBLY

(71) Applicant: Ford Global Technologies, LLC, Dearborn, MI (US)

(72) Inventors: Johnathan Andrew Line, Northville, MI (US); Marcos Silva Kondrad, Macomb Township, MI (US); Daniel Ferretti, Commerce Township, MI (US); Kevin Wayne Preuss, Berkley, MI (US); S. M. Akbar Berry, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/798,528

(22) Filed: Oct. 31, 2017

(65) Prior Publication Data

US 2019/0126787 A1    May 2, 2019

(51) Int. Cl.
*B60N 2/14* (2006.01)
*B60N 2/06* (2006.01)
*B60N 2/07* (2006.01)

(52) U.S. Cl.
CPC .............. *B60N 2/143* (2013.01); *B60N 2/06* (2013.01); *B60N 2/0742* (2013.01)

(58) Field of Classification Search
CPC .......... B60N 2/005; B60N 2/04; B60N 2/062; B60N 2/0742; B60N 2/14; B60N 2/143

USPC .......... 296/64, 65.01, 65.06, 65.07
See application file for complete search history.

(56) References Cited

U.S. PATENT DOCUMENTS

| | | |
|---|---|---|
| 5,000,505 A | 3/1991 | Kawashita et al. |
| 5,951,106 A | 9/1999 | Hirama et al. |
| 6,666,514 B2 | 12/2003 | Muraishi et al. |
| 7,108,325 B2 | 9/2006 | Williamson et al. |
| 7,341,302 B2 | 3/2008 | Slade |
| 7,357,451 B2 | 4/2008 | Bendure et al. |
| 7,380,859 B2 | 6/2008 | Gardiner |
| 7,950,740 B2 | 5/2011 | Bunea et al. |
| 10,040,373 B2 * | 8/2018 | Rawlinson ........... B60N 2/0244 |
| 10,046,675 B1 * | 8/2018 | Whitens .................. B60N 2/24 |
| 2003/0141736 A1 * | 7/2003 | Chernoff ................. B60N 2/01 296/65.01 |
| 2009/0152907 A1 * | 6/2009 | Lee .......................... B60N 2/01 297/1 |
| 2009/0195037 A1 | 8/2009 | Plavetich et al. |
| 2010/0001169 A1 * | 1/2010 | Armo ...................... B60N 2/06 248/636 |
| 2017/0182914 A1 * | 6/2017 | Lonstein ............. B60N 2/0232 |

* cited by examiner

*Primary Examiner* — Jason S Daniels
(74) *Attorney, Agent, or Firm* — Vichit Chea; Price Heneveld LLP

(57) ABSTRACT

A seating assembly includes a turntable that is rotatable about a first vertical axis. A seatbase is slidably coupled to the turntable. The seatbase is configured to slidably actuate regardless of a rotational position of the turntable. The seating assembly may be installed in a vehicle.

20 Claims, 10 Drawing Sheets

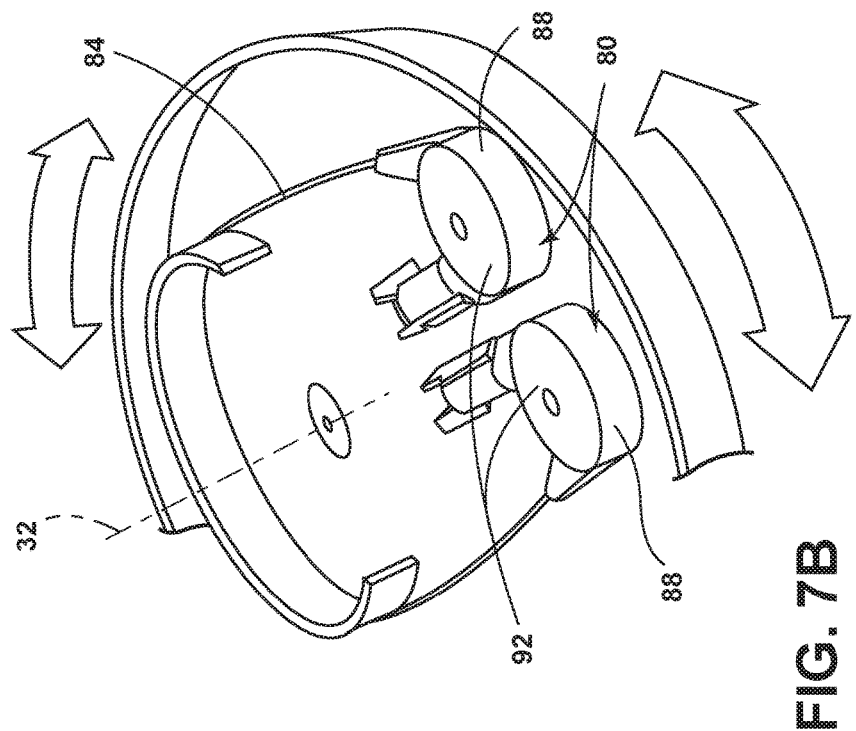
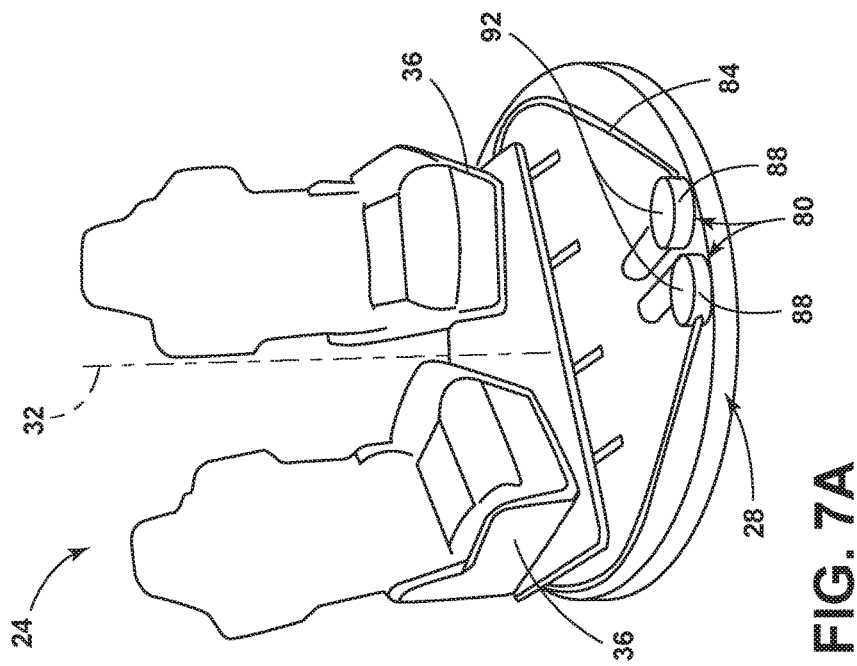

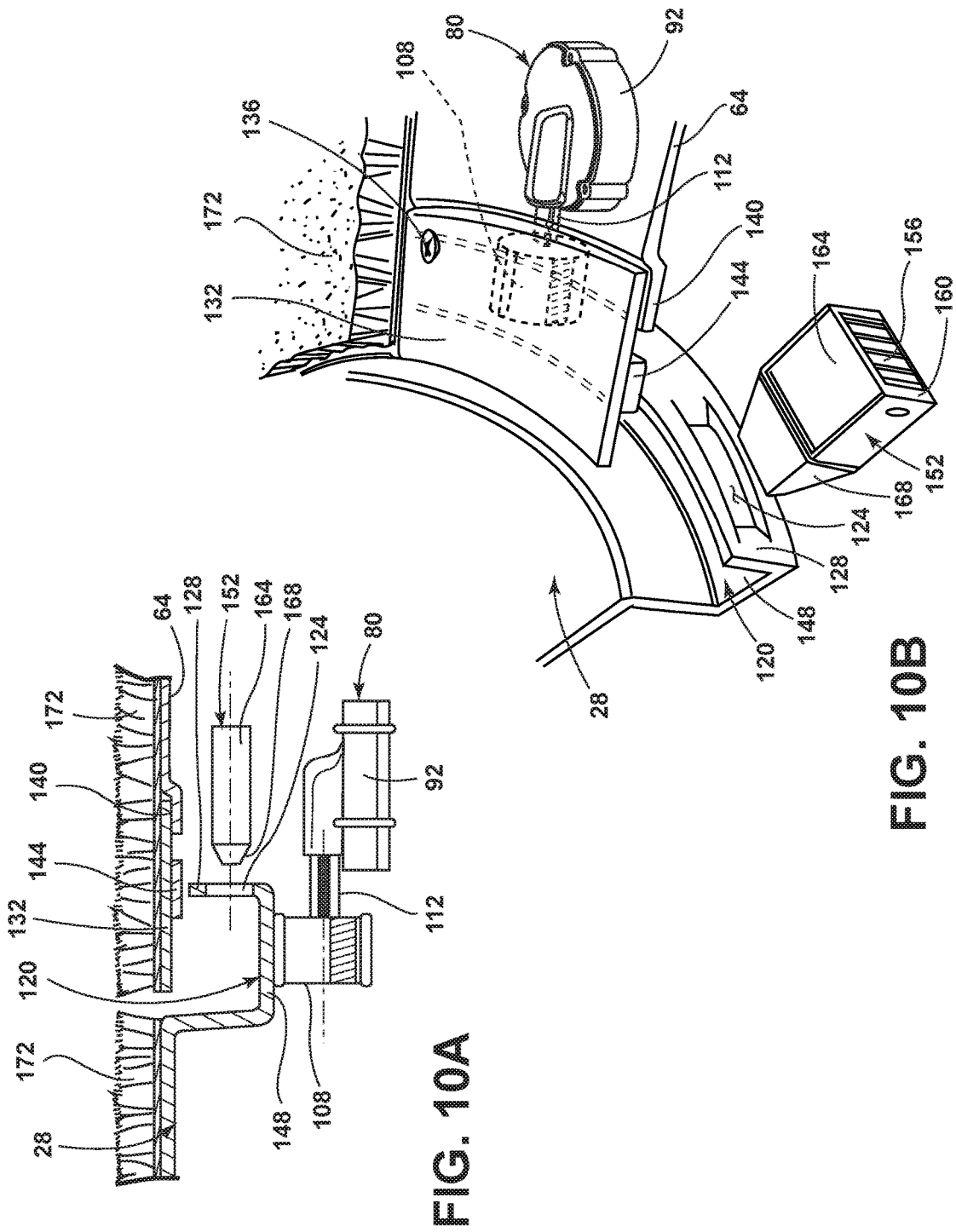

ADJUSTABLE SEATING ASSEMBLY

FIELD OF THE DISCLOSURE

The present disclosure generally relates to a seating assembly. More specifically, the present disclosure relates to an adjustable seating assembly.

BACKGROUND OF THE INVENTION

Seating assemblies are typically provided with primarily fore and aft adjustment of the seating assembly relative to a support surface. However, users desire additional adjustability and/or functionality for the seating assembly. Accordingly, there is a need for seating assemblies that provide additional adjustability and flexibility in configuration for improved user experience.

SUMMARY OF THE INVENTION

According to a first aspect of the present disclosure, a seating assembly includes a turntable that is rotatable about a first vertical axis. A seatbase is slidably coupled to the turntable. The seatbase is configured to slidably actuate regardless of a rotational position of the turntable.

Embodiments of the first aspect of the present disclosure can include any one or a combination of the following features:
  the seatbase is slidable in a first direction and a second direction, wherein the first direction and the second direction are non-parallel to one another;
  the seating assembly further includes a platform that operably couples the seatbase to the turntable, wherein the platform is slidable in the first direction relative to the turntable, and wherein the seatbase is slidable in the second direction relative to the platform;
  the seatbase is additionally pivotably coupled to the turntable such that the seatbase may pivot about a second vertical axis;
  the seating assembly further includes a seat and a seatback, wherein at least one of the seat and the seatback are operably coupled to the seatbase;
  the turntable has a first chair assembly and a second chair assembly operably coupled thereto; and
  the seating assembly is installed in a vehicle.

According to a second aspect of the present disclosure, a seating assembly includes a turntable that is rotatable about a first vertical axis. A seatbase is pivotably coupled to the turntable. The seatbase is configured to pivot about a second vertical axis regardless of a rotational position of the turntable.

Embodiments of the second aspect of the present disclosure can include any one or a combination of the following features:
  the seatbase is pivotable relative to the turntable in a range from at least about one degree to less than about one-hundred-eighty degrees;
  the seatbase is pivotable relative to the turntable in a range from at least about five degrees to less than about ninety degrees;
  the seatbase is additionally slidably coupled to the turntable such that the seatbase may be slidably actuated regardless of the rotational position of the turntable;
  the seatbase is slidable in a first direction and a second direction, wherein the first direction and the second direction are non-parallel to one another; and
  the seating assembly further includes a platform that operably couples the seatbase to the turntable, wherein the platform is slidable in the first direction relative to the turntable, and wherein the seatbase is slidable in the second direction relative to the platform, and wherein the seatbase is pivotable about the second vertical axis relative to the platform.

According to a third aspect of the present disclosure, a seating assembly for a vehicle includes a turntable that is rotatable about a first vertical axis. A seatbase is slidably and pivotably coupled to the turntable. The seatbase is configured to pivot about a second vertical axis and slidably actuated regardless of a rotational position of the turntable.

Embodiments of the third aspect of the present disclosure can include any one or a combination of the following features:
  the seatbase is pivotable relative to the turntable in a range from at least about five degrees to less than about ninety degrees;
  the seatbase is slidable in a first direction and a second direction, wherein the first direction and the second direction are non-parallel to one another;
  the seating assembly further includes a platform that operably couples the seatbase to the turntable, wherein the platform is slidable in the first direction relative to the turntable, and wherein the seatbase is slidable in the second direction relative to the platform;
  the seatbase is pivotable about the second vertical axis relative to the platform;
  the seating assembly further includes a seat and a seatback, wherein at least one of the seat and the seatback are operably coupled to the seatbase; and
  the turntable has a first chair assembly and a second chair assembly operably coupled thereto.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 7A is a front perspective view of the seating assembly illustrating a drive mechanism, according to one embodiment;

FIG. 7B is a front perspective view of the drive mechanism depicted in FIG. 7A illustrating a cable-driven drive mechanism, according to one embodiment;

FIG. 10A is a cross-sectional view taken along line XA-XA of FIG. 6, illustrating the drive mechanism according to a further embodiment; and FIG. 10B is a top perspective view of the drive mechanism depicted in FIG. 10A.

DETAILED DESCRIPTION OF THE PREFERRED EMBODIMENTS

Figure 1:
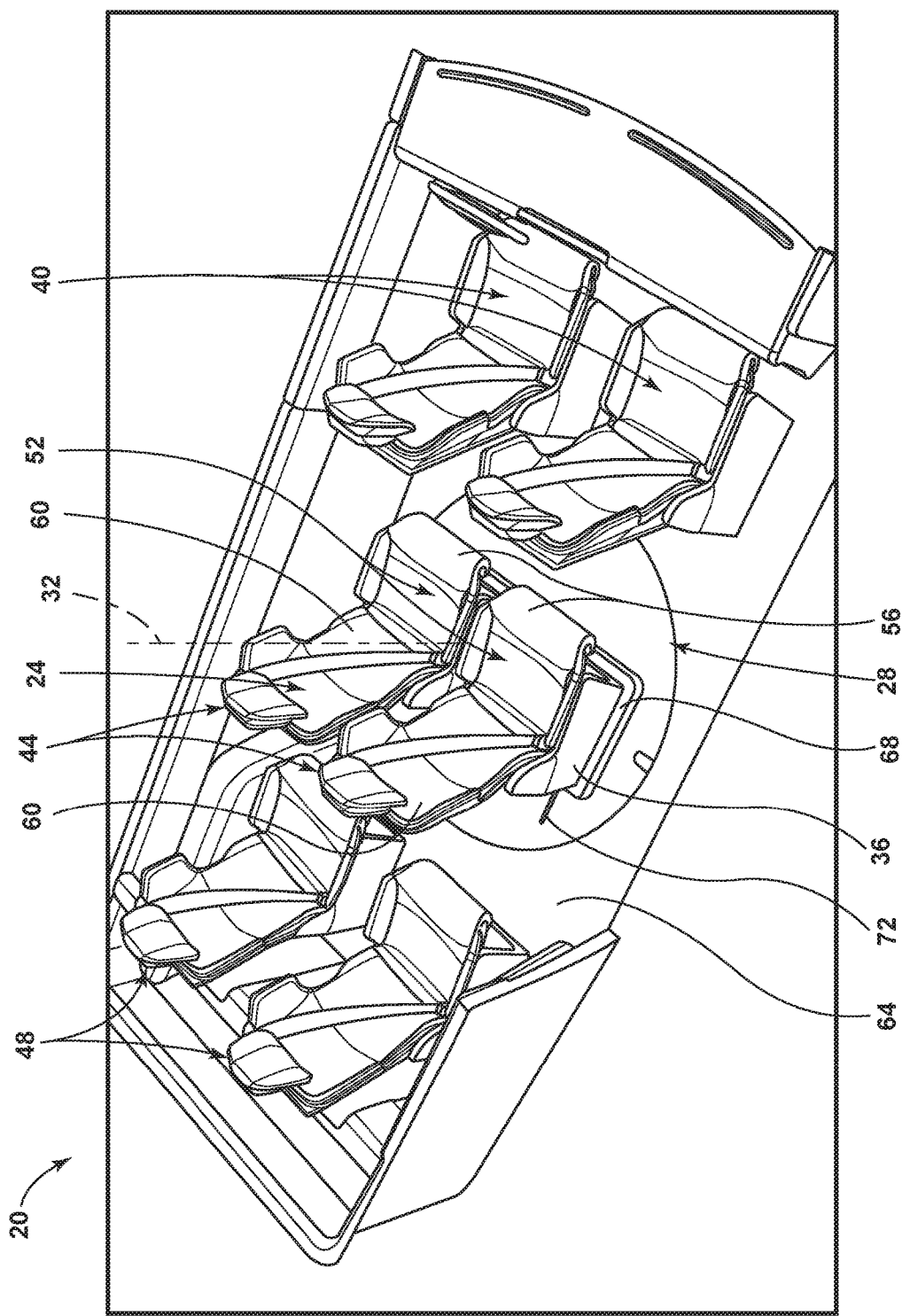
FIG. 1 is a top perspective view of a cabin of a vehicle illustrating a seating assembly in a forward-facing position and a shoulder-to-shoulder configuration, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference numeral 20 generally designates a vehicle. The vehicle 20 may be a wheeled motor vehicle, a boat, a plane, a drive-controlled vehicle, and/or an autonomous vehicle. The vehicle 20 is equipped with a seating assembly 24. The seating assembly 24 includes a turntable 28 that is rotatable about a first vertical axis 32. The seating assembly 24 further includes a seatbase 36 that is slidably coupled to the turntable 28. The seatbase 36 can be slidably actuated regardless of a rotational position of the turntable 28.

Referring again to FIGS. 1 and 2, the vehicle 20 is shown with a first row 40, a second row 44, and a third row 48 of chair assemblies 52. The seating assembly 24 is positioned in the second row 44, according to one embodiment. The chair assemblies 52 further include a seat 56 and a seatback 60. At least one of the seat 56 and the seatback 60 may be operably coupled to the seatbase 36. The turntable 28 is integrated into a floor 64 of the vehicle 20 in a substantially continuous or smooth manner such that occupants of the vehicle 20 are presented with a substantially continuous or smooth surface. In some embodiments, a platform 68 operably couples the seatbase 36 to the turntable 28. The platform 68 may slidably engage with the turntable 28 such that the platform 68 is capable of slidable motion in a first direction relative to the turntable 28. The seatbase 36 may be slidable in a second direction relative to the platform 68. In the depicted embodiment, the platform 68 may slide in a vehicle forward direction and a vehicle rearward direction by actuation of the platform 68 along a plurality of turntable tracks 72. The turntable tracks 72 may be integrally formed with the turntable 28 such that as the turntable 28 rotates about the first vertical axis 32, the turntable tracks 72 rotate with the turntable 28. The platform 68 may be equipped with platform tracks 76 that extend along the platform 68 in a direction that is non-parallel to the turntable tracks 72.

Figure 2:
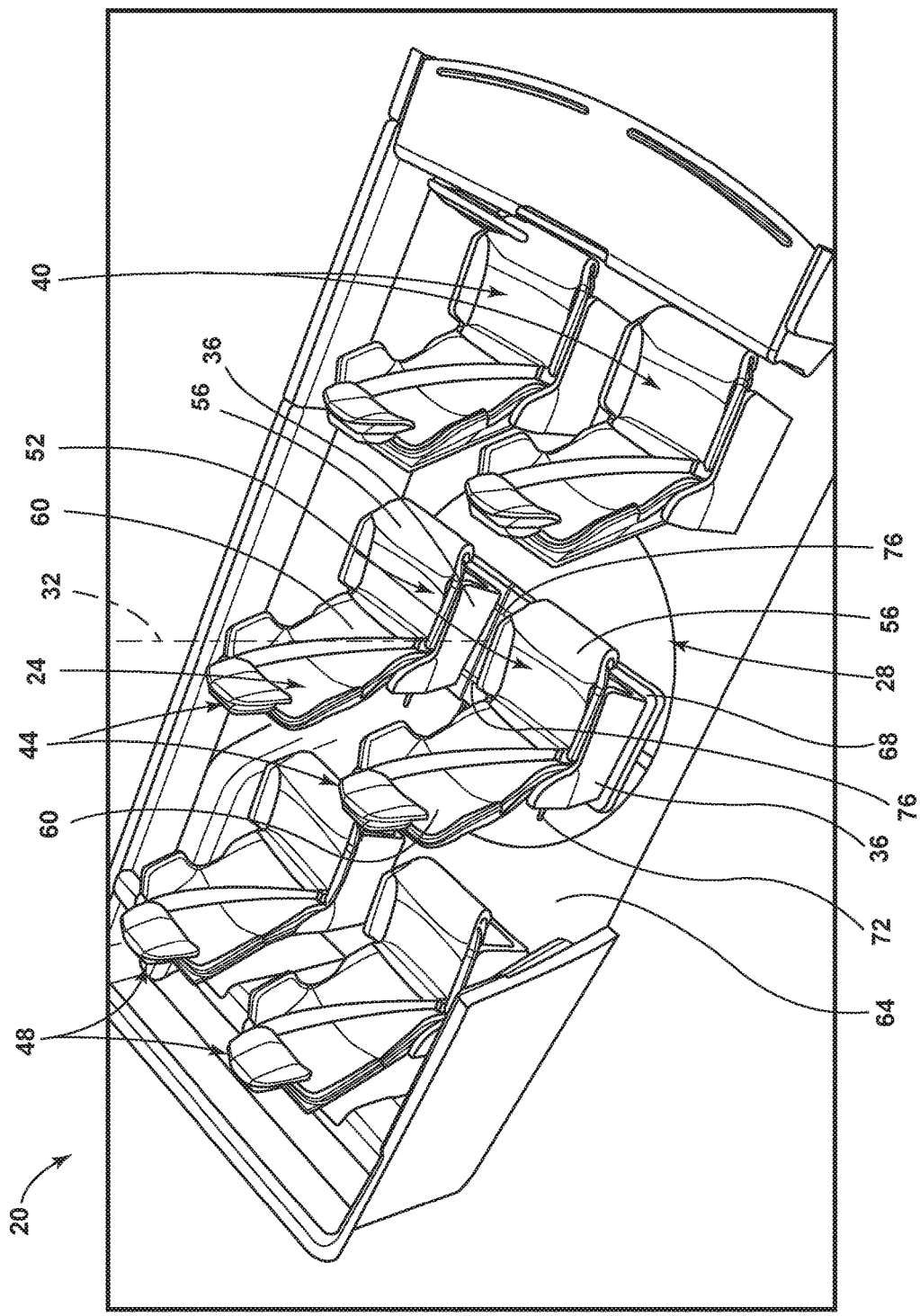
FIG. 2 is a top perspective view of the cabin of the vehicle illustrating the seating assembly in the forward-facing position and a spaced-apart configuration, according to one embodiment.

Referring further to FIGS. 1 and 2, the seatbases 36 and their associated chair assemblies 52 that are operably coupled to the platform 68 may be actuated along the platform tracks 76 such that the chair assemblies 52 may be actuated between a shoulder-to-shoulder configuration (FIG. 1) and a spaced-apart configuration (FIG. 2). The seatbase 36 may be slidable in the first direction and the second direction. The first direction of slidable engagement of the seatbase 36 may be defined by the turntable tracks 72. The second direction of slidable actuation of the seatbase 36 may follow, or generally be defined by, the platform tracks 76. The shoulder-to-shoulder configuration of the chair assemblies 52 may be beneficial for allowing easier ingress and egress of occupants to and from the third row 48. Additionally, the shoulder-to-shoulder configuration provides an increase in an uninterrupted surface area available for storage on the floor 64 on the vehicle 20. It is contemplated that while the first direction and the second direction are shown as non-parallel to each other, some embodiments may provide the first direction and the second direction as parallel to one another such that the chair assemblies 52 and/or the platform 68 may be actuated to a greater extent in a particular direction than in embodiments where the first direction and the second direction are non-parallel to one another.

Figure 3:
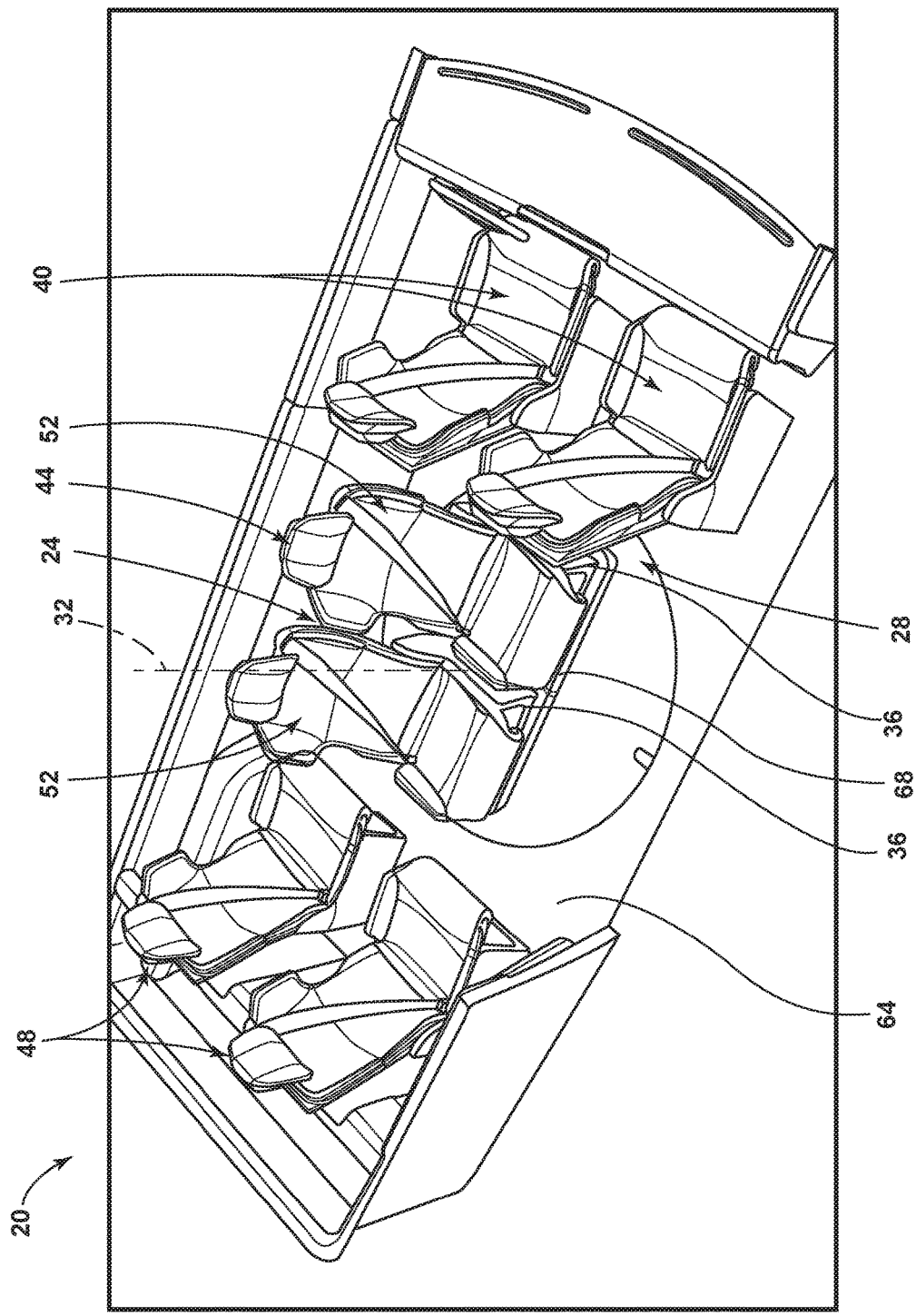
FIG. 3 is a top perspective view of the cabin of the vehicle illustrating the seating assembly in a side-facing position and the shoulder-to-shoulder configuration, according to one embodiment.
Figure 4:
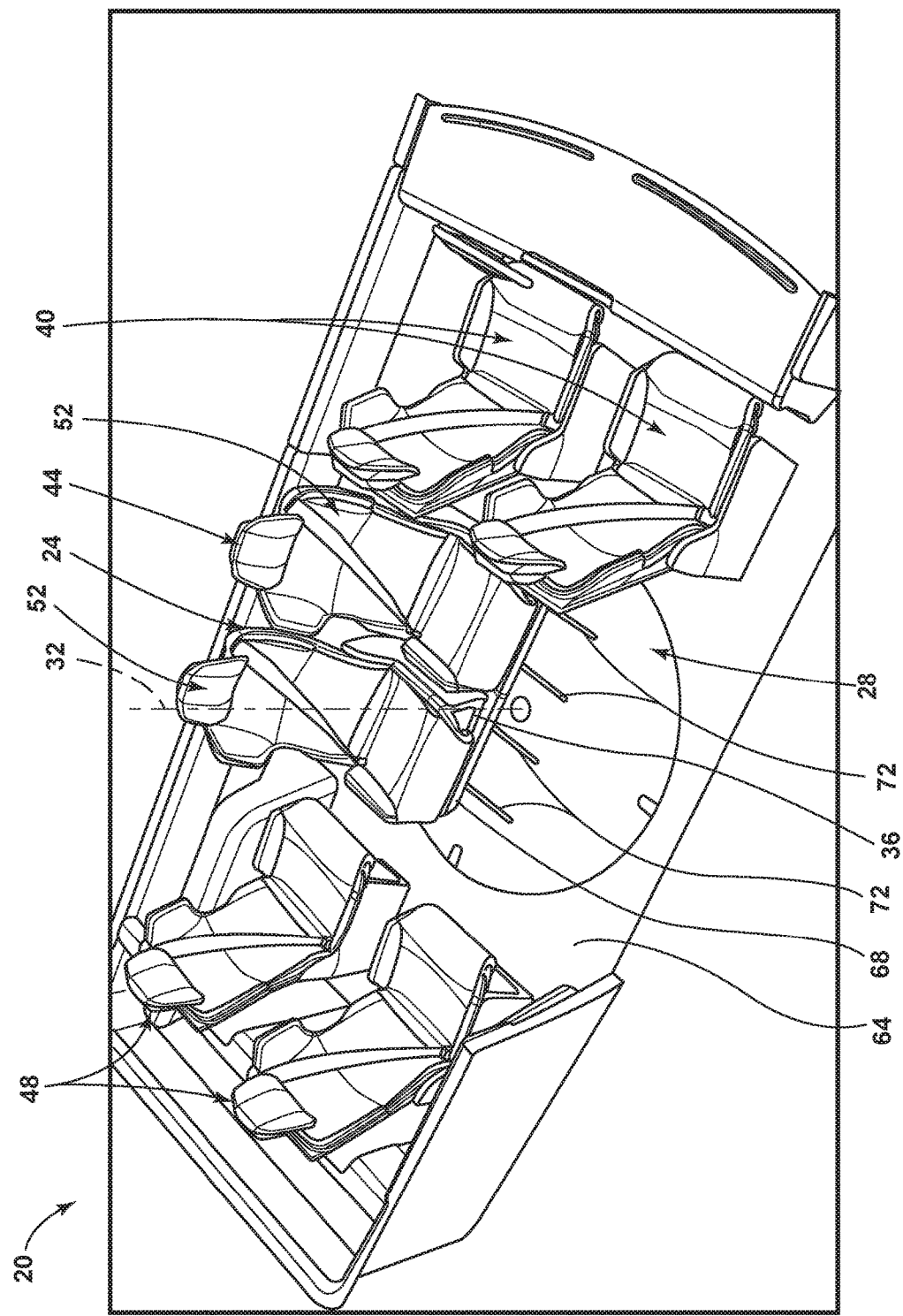
FIG. 4 is a top perspective view of the cabin of the vehicle illustrating the seating assembly in the side-facing position and in a turntable rearward-actuated position, according to one embodiment.

Referring now to FIGS. 3 and 4, the seating assembly 24 is shown rotated ninety degrees (90°) from the forward-facing position depicted in FIGS. 1 and 2 to assume the side-facing position depicted here. The shoulder-to-shoulder configuration of the chair assemblies 52 may be preferable when the seating assembly 24 is rotating about the first vertical axis so as to provide additional clearance between the rotating chair assemblies 52, the first row 40, and/or the second row 44. When the seating assembly 24 is in the side-facing position, the platform 68 maintains the ability to be actuated along the turntable tracks 72 between a forward-actuated position (FIG. 3) and a turntable rearward-actuated position (FIG. 4). The turntable rearward-actuated position of the platform 68 may be preferable when the seating assembly 24 is in the side-facing position. When the seating assembly 24 is in the side-facing position and the platform 68 is in the turntable rearward-actuated position, there is an increase in the uninterrupted surface area of the floor 64 such that items may be stored within the vehicle 20. Additionally, occupants of the second row 44 and the third row 48 may have an easier time conversing with one another when the seating assembly 24 is in the side-facing position and the platform 68 is in the turntable rearward-actuated position.

Figure 5:
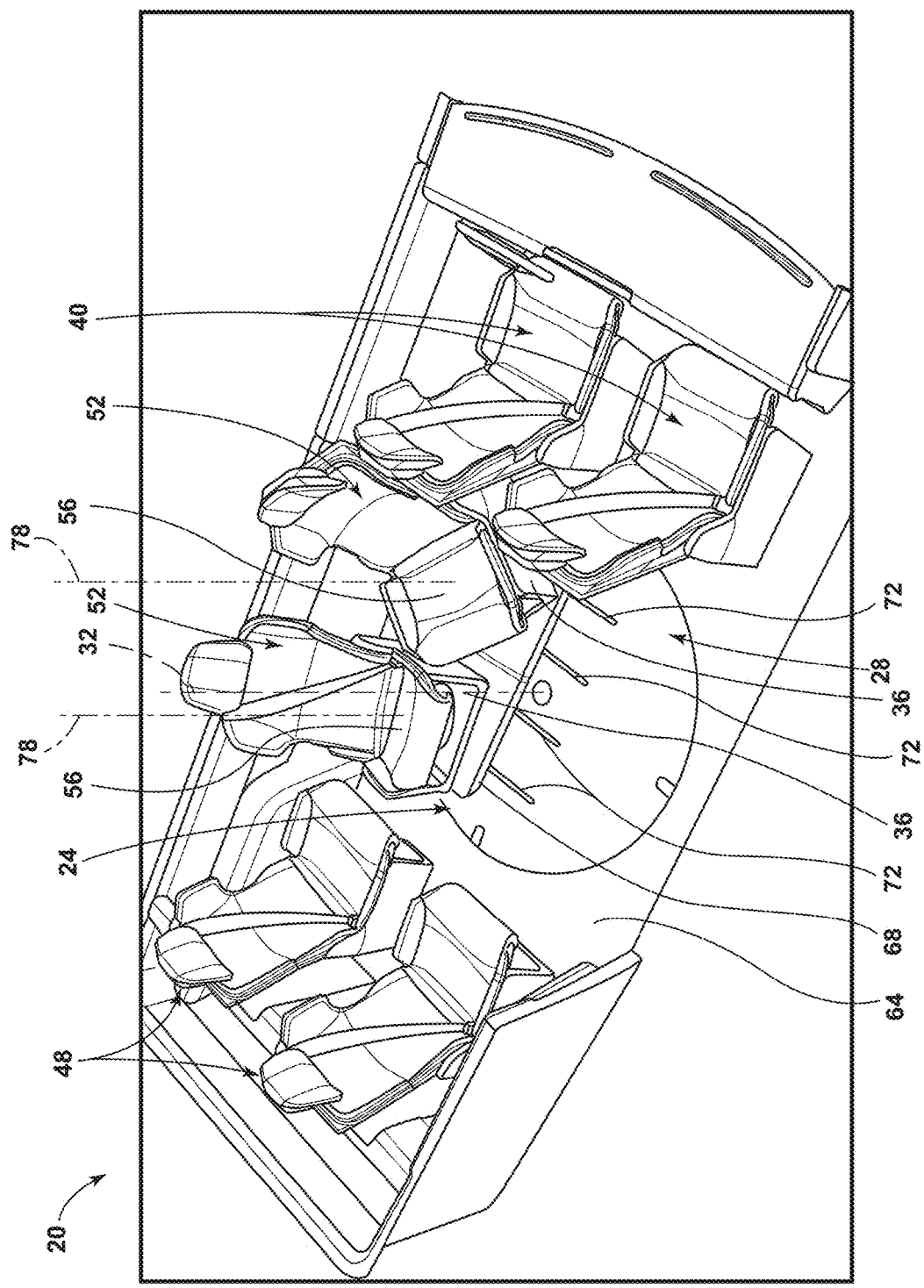
FIG. 5 is a top perspective view of the cabin of the vehicle illustrating chair assemblies of the seating assembly in a pivoted position toward one another, according to one embodiment.

Referring to FIG. 5, the seating assembly 24 is shown in the side-facing position with the platform 68 in the turntable rearward-actuated position. Additionally, the seatbases 36 and their associated chair assemblies 52 are pivoted slightly toward one another about a second vertical axis 78 that is positioned approximately through a center of each of the seats 56 of the chair assemblies 52. The seatbases 36 and their associated chair assemblies 52 may be pivoted about the second vertical axis 78 regardless of the rotational position of the turntable 28. In some embodiments, the seatbases 36 may be directly and pivotably coupled to the turntable 28. In alternative embodiments, the seatbases 36 may be directly and pivotably coupled to the platform 68. The seatbases 36 and their associated chair assemblies 52 may pivot through a full three-hundred-sixty degrees (360°) rotation relative to the platform 68. That is, in addition to the rotational motion possible with the turntable 28, the seatbases 36 and their associated chair assemblies 52 may pivot independently from the turntable 28. In various embodiments, the pivotable motion of the seatbases 36 and their associated chair assemblies 52 may pivot relative to the platform 68 and/or the turntable 28 in a range of at least about one degree (1°) to less than about fifteen degrees (15°), at least about fifteen degrees (15°) to less than about thirty degrees (30°), at least about thirty degrees (30°) to less than about sixty (60°) degrees, at least about sixty degrees (60°) to less than about ninety degrees (90°), at least about ninety degrees (90°) to less than about one-hundred-twenty degrees (120°), at least about one-hundred-twenty degrees (120°) to less than about one-hundred-eighty degrees (180°), at least about one-hundred-eighty degrees (180°) to less than about three-hundred-sixty degrees (360°), and/or combinations or ranges thereof including intermediate values.

Referring again to FIG. 5, the pivotable motion of the seatbases 36 and their associated chair assemblies 52 may be configured to mirror one another. Said another way, in embodiments that provide the pivotable motion as less than about three-hundred-sixty degrees (360°), the pivotable motion of the seatbases 36 and their associated chair assemblies 52 may be configured to be mirror images of one another such that occupants may turn to at least partially face one another while occupying the chair assemblies 52 on the turntable 28. The seatbases 36 have also been actuated along the platform tracks 76 to assume the spaced-apart position. It may be beneficial to have the seatbases 36 actuated along the platform tracks 76 when the chair assemblies 52 are in the pivoted position depicted here. The spaced-apart position of the chair assemblies 52 may allow for additional spacing between the legs of occupants that are seated in the chair assemblies 52. With the chair assemblies 52 in the pivoted position shown, occupants of the chair assemblies 52 may converse with one another and not have to turn their heads or upper bodies to as great of an extent as when the chair assemblies 52 are not in the pivoted position.

Figure 6:
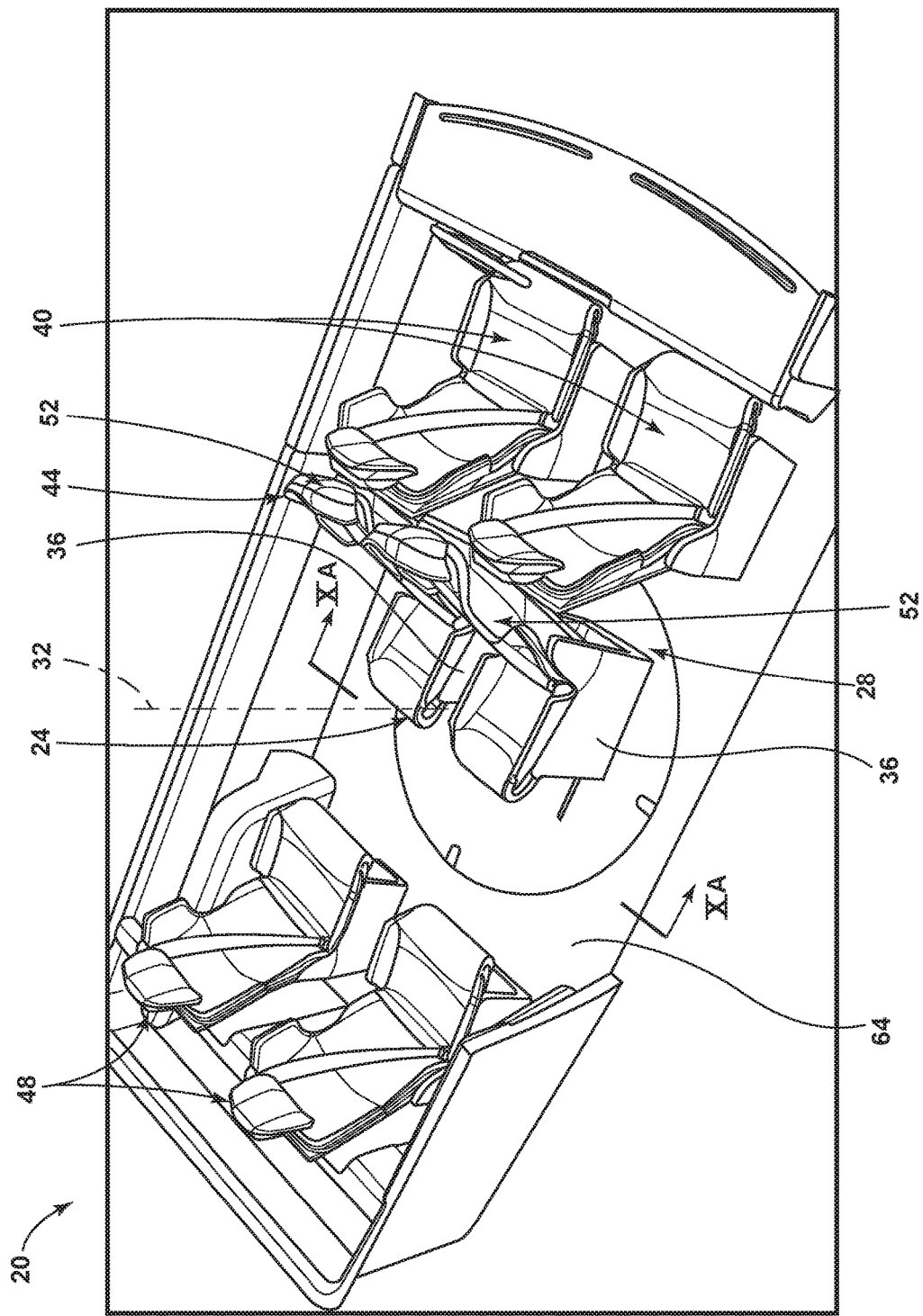
FIG. 6 is a top perspective view of the cabin of the vehicle illustrating the seating assembly in a rear-facing position and the turntable rearward-actuated position, according to one embodiment.

Referring now to FIG. 6, the seating assembly 24 is shown in a rear-facing position. Additionally, the platform 68 is in the turntable rearward-actuated position such that the seatbacks 60 of the first row 40 and the second row 44 are in close proximity to one another. By so positioning the seating assembly 24, additional surface area is available on the floor 64 of the vehicle 20 to accommodate cargo items or to allow occupants of the chair assemblies 52 that are facing one another to sit comfortably while remaining free of physical contact with one another. The rear-facing position of the seating assembly 24 may be particularly desirable for occupants who wish to converse with one another. The rear-facing position of the seating assembly 24 may provide a substantially lower difficulty for ingress and egress of occupants to the second row 44 and the third row 48 than other positions. The rear-facing position of the seating assembly 24 may be a preferable configuration of the vehicle 20 when the vehicle 20 is being operated as a ride-sharing or taxi service.

Referring to FIGS. 7A and 7B, a drive mechanism 80 for rotatable actuation of the turntable 28 is shown, according to one embodiment. The depicted embodiment of the drive mechanism 80 is a cable-driven mechanism. The drive mechanism 80 may include a cable 84, one or more pulleys 88, and/or one or more motors 92. The drive mechanism 80 is housed within the turntable 28 such that occupants of the vehicle 20 (FIG. 1) are not presented with safety hazards from the movable parts of the drive mechanism 80. In some embodiments, the motor 92 may be integrally formed with the pulleys 88 such that the pulley 88 and the motor 92 are a combination that is capable of spooling the cable 84 around the pulleys 88.

Figure 8:
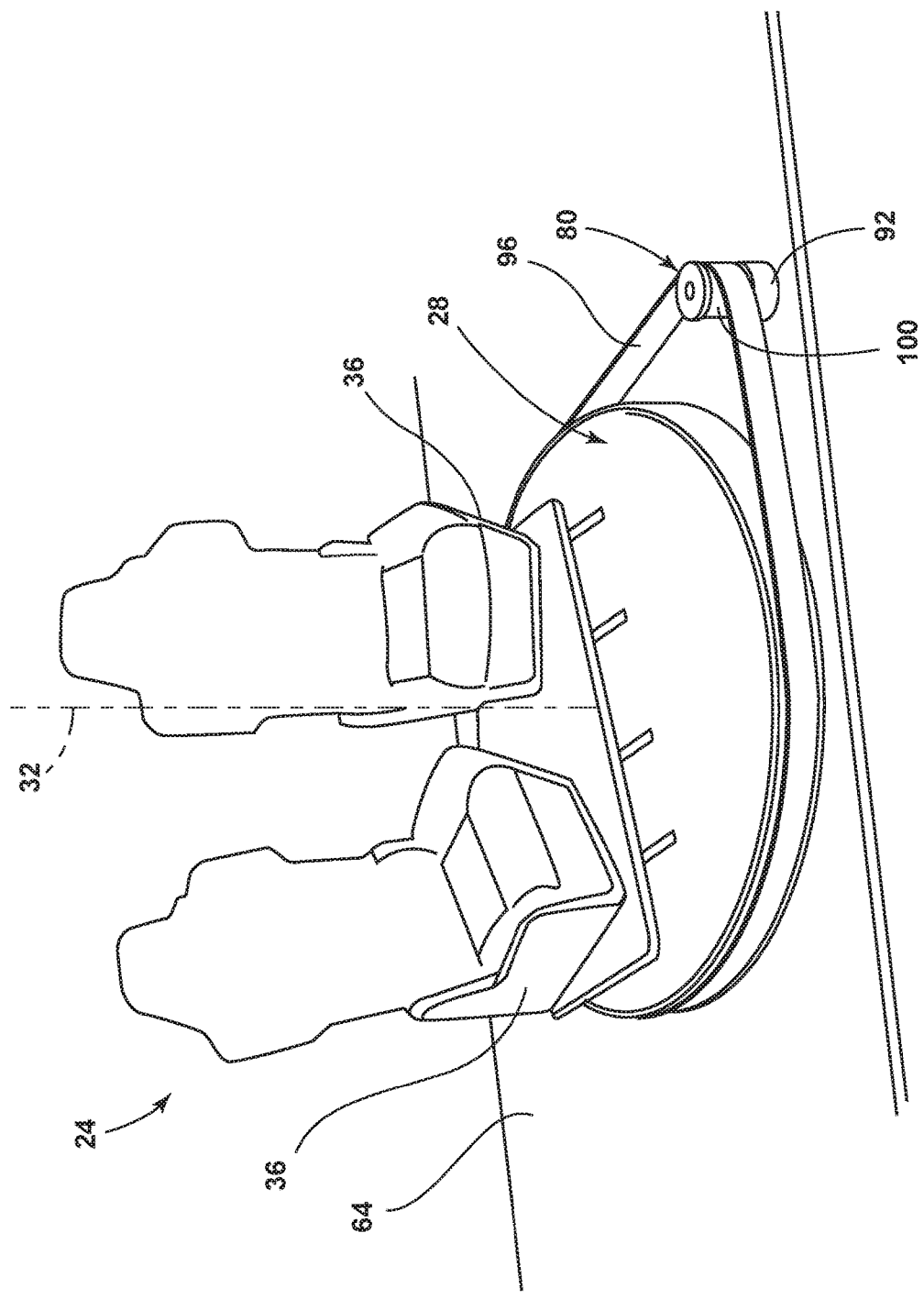
FIG. 8 is a front perspective view of the seating assembly illustrating the drive mechanism, according to another embodiment.

Referring now to FIG. 8, the drive mechanism 80 may be a belt-driven mechanism. The drive mechanism 80 may be housed below a surface of the floor 64 of the vehicle 20 (FIG. 1). The drive mechanism 80 may be positioned below the turntable 28 or radially outward from the turntable 28. The drive mechanism 80 of the depicted embodiment includes a belt 96, a drive wheel 100, and/or the motor 92. The belt 96 may extend around a circumference of the turntable 28 and engage with an exterior surface of the drive wheel 100. The motor 92 may be capable of clockwise and/or counterclockwise motion such that the turntable 28 may be rotated in clockwise and/or counterclockwise directions. The drive mechanism 80 may include a braking system that may be engaged as the turntable 28 approaches a desired position. The braking system may be controlled by a controller that is equipped with preset positions of the turntable 28 such that the controller is able to sense when the turntable 28 is approaching one of the present positions, for example, by utilizing a rotational displacement sensor. Alternatively, the turntable 28 may be button-activated such that the braking system engages when an occupant releases the button responsible for rotational actuation of the turntable 28. In another alternative, the turntable 28 may be manually actuated such that the braking mechanism may be omitted.

Figure 9:
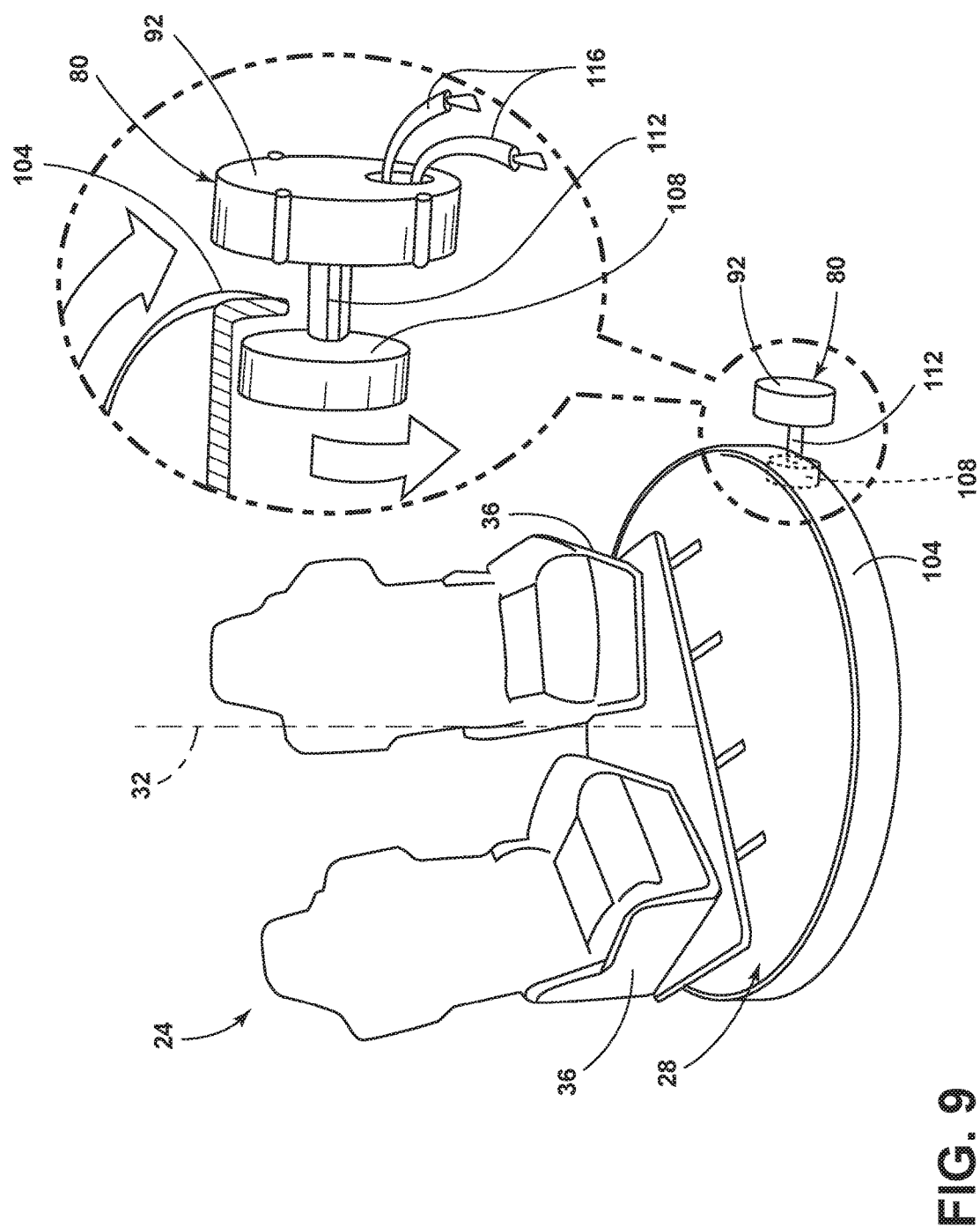
FIG. 9 is a front perspective view of the seating assembly illustrating the drive mechanism, according to yet another embodiment.

Referring to FIG. 9, the drive mechanism 80 may be a wheel-driven mechanism. In the depicted embodiment the turntable 28 is equipped with a lip 104 that may extend downward from a top surface of the turntable 28 and/or depend from a perimeter of the turntable 28. The lip 104 may be configured to engage with a wheel 108 of the drive mechanism 80. The motor 92 of the drive mechanism 80 may be operably coupled to the wheel 108 by a driveshaft 112. The drive mechanism 80 may be capable of clockwise and counterclockwise rotation such that clockwise and counterclockwise actuation of the turntable 28 is possible. In some embodiments, the drive mechanism 80 may be rotatable in clockwise or counterclockwise direction such that the turntable 28 may be rotated in a clockwise or counterclockwise direction while not being permitted to rotate in the other of the clockwise or counterclockwise direction. The motor 92 may be an electric motor that is electrically coupled to a power supply, such as the battery of the vehicle 20 (FIG. 1), by electrical pigtails 116. The lip 104 may be positioned generally vertically above the driveshaft 112.

Referring now to FIGS. 10A and 10B, the turntable 28 may be equipped with a trough 120. The trough 120 may be generally U-shaped and may define one or more apertures 124 in an outer wall 128 of the trough 120. The floor 64 of the vehicle 20 (FIG. 1) may include an access ring 132 that is positioned above the trough 120 and generally radially outward from a top surface of the turntable 28. The access ring 132 may be operably coupled to the floor 64 of the vehicle 20 by one or more fasteners 136. The access ring 132 and the floor 64 may engage at a step 140 in the floor 64. The step 140 in the floor 64 is generally configured to correspond with the access ring 132 such that a generally smooth surface is maintained as the floor 64 transitions to the access ring 132. Said another way, the step 140 may be recessed from a top surface of the floor 64 an amount that corresponds to a thickness of the access ring 132. The fasteners 136 may couple the access ring 132 to the step 140 in the floor 64. The access ring 132 may be equipped with a protrusion 144 that extends from an underside of the access ring 132. The protrusion 144 may be spaced away from the step 140 such that the outer wall 128 of the trough 120 may travel between the protrusion 144 and the step 140. Alternatively, the outer wall 128 may be positioned generally below the protrusion 144 such that the protrusion 144 may be supported by the outer wall 128 of the trough 120.

Referring again to FIGS. 10A and 10B, the motor 92 may be positioned below the floor 64. The driveshaft 112 may extend from the motor 92 such that the wheel 108 is positioned below a bottom wall 148 of the trough 120. The wheel 108 may engage with an underside of the bottom wall 148 such that rotational motion imparted to the wheel 108 by the motor 92 is translated to the turntable 28. The drive mechanism 80 may additionally include one or more stop pins 152 that are configured to engage with the one or more apertures 124 in the trough 120. The stop pin 152 may include a core 156 that is made from a substantially rigid material (e.g., steel) and a casing 160 that is made from a material that is softer than the core 156 (e.g., nylon). The stop pin 152 may include a planar portion 164 and a tapered portion 168. The tapered portion 168 may be configured to engage with the apertures 124 in the trough 120. In general, the one or more stop pins 152 may be utilized as the braking system for the drive mechanism 80 or turntable 28. Additionally, the one or more stop pins 152 may be utilized for increased safety while the vehicle 20 is in motion, for example, during vehicle maneuvers or impact events. A floor covering 172 may be coupled to a top surface of the turntable 28, the floor 64, and/or the access ring 132. The fasteners 136 of the access ring 132 may remain accessible below the floor covering 172 such that maintenance and/or service to the turntable 28 and drive mechanism 80 may be made easier. While the access ring 132 is shown and described as being coupled to the floor 64, it is contemplated that the access ring 132 may be operably coupled to the turntable 28 or another part of the vehicle 20 without departing from the concepts disclosed herein.

The seating assembly 24 of the present disclosure provides additional adjustability and flexibility to the configuration of a cabin of the vehicle 20. The seating assembly 24 may be provided as a modular assembly that is configured for rapid assembly into the vehicle 20 in a predictable manner and with greater ease than alternative approaches that may utilize seating assemblies that are supported on individual turntable-like solutions. The seating assembly 24 of the present disclosure eliminates multiple in-floor track systems and motion transfer points that complicate the management of the motion of the seating assembly in alternative approaches that may utilize individual turntable-like solutions for each chair assembly 52.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A seating assembly, comprising:
   a turntable that is rotatable about a first vertical axis;
   a seatbase slidably coupled to the turntable by turntable tracks; and
   a platform that couples the seatbase to the turntable tracks, wherein the seatbase is slidably coupled to the platform by platform tracks.

2. The seating assembly of claim 1, wherein the seatbase is slidable in a first direction and a second direction, and wherein the first direction and the second direction are non-parallel to one another.

3. The seating assembly of claim 2, wherein the platform is slidable along the turntable tracks in the first direction relative to the turntable, and wherein the seatbase is slidable along the platform tracks in the second direction relative to the platform.

4. The seating assembly of claim 1, wherein the seatbase is additionally pivotably coupled to the turntable such that the seatbase pivots about a second vertical axis.

5. The seating assembly of claim 4, wherein the seatbase is pivotable relative to the turntable.

6. The seating assembly of claim 4, wherein the seatbase pivots about the second vertical axis through a rotational displacement of greater than about forty-five degrees.

7. The seating assembly of claim 1, wherein the seating assembly is installed in a vehicle.

8. A seating assembly, comprising:
   a turntable that is rotatable about a first vertical axis; and
   a seatbase slidably and pivotably coupled to the turntable, wherein the seatbase is configured to pivot about a second vertical axis through a rotational displacement of at least about forty-five degrees regardless of a rotational position of the turntable.

9. The seating assembly of claim 8, wherein the seatbase is pivotable relative to the turntable such that the rotational displacement is at least about sixty degrees.

10. The seating assembly of claim 8, wherein the seatbase is pivotable relative to the turntable.

11. The seating assembly of claim 8, wherein the seatbase is slidably coupled to the turntable such that the seatbase can slidably actuated regardless of the rotational position of the turntable.

12. The seating assembly of claim 11, wherein the seatbase is slidable in a first direction and a second direction, and wherein the first direction and the second direction are non-parallel to one another.

13. The seating assembly of claim 12, further comprising:
    a platform that operably couples the seatbase to the turntable, wherein the platform is slidable in the first direction relative to the turntable, wherein the seatbase is slidable in the second direction relative to the platform, and wherein the seatbase is pivotable about the second vertical axis relative to the platform.

14. A seating assembly for a vehicle, comprising:
    a turntable that is rotatable about a first vertical axis;
    a seatbase slidably and pivotably coupled to the turntable, wherein the seatbase is configured to pivot about a second vertical axis; and
    a platform that couples the seatbase to the turntable, wherein the platform is slidable in a first direction relative to the turntable, and wherein the seatbase is slidable in a second direction relative to the platform.

15. The seating assembly for a vehicle of claim 14, wherein the seatbase is pivotable relative to the turntable in a range from at least about five degrees to less than about ninety degrees.

16. The seating assembly for a vehicle of claim 15, wherein the first direction and the second direction are non-parallel to one another.

17. The seating assembly for a vehicle of claim 14, wherein the seatbase is configured to be slidably actuated regardless of a rotational position of the turntable.

18. The seating assembly for a vehicle of claim 17, wherein the seatbase is pivotable about the second vertical axis relative to the platform.

19. The seating assembly for a vehicle of claim 18, further comprising:
    a seat; and
    a seatback, wherein at least one of the seat and the seatback are operably coupled to the seatbase.

20. The seating assembly for a vehicle of claim 19, wherein the turntable has a first chair assembly and a second chair assembly operably coupled thereto.

* * * * *